US011964498B2

(12) United States Patent
Sole Enrech et al.

(10) Patent No.: US 11,964,498 B2
(45) Date of Patent: Apr. 23, 2024

(54) PRINTERS

(71) Applicant: Hewlett-Packard Development Company, L.P., Spring, TX (US)

(72) Inventors: Luis Sole Enrech, Sant Cugat del Valles (ES); Ricardo Oltra Ramirez, Sant Cugat del Valles (ES); Jose Angel Villasante Bembibre, Sant Cugat del Valles (ES); Alex Rius Laorden, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/418,972

(22) PCT Filed: Aug. 15, 2019

(86) PCT No.: PCT/US2019/046699

§ 371 (c)(1),
(2) Date: Jun. 28, 2021

(87) PCT Pub. No.: WO2021/029895

PCT Pub. Date: Feb. 18, 2021

(65) Prior Publication Data

US 2022/0184982 A1 Jun. 16, 2022

(51) Int. Cl.
*B41J 25/308* (2006.01)
*B41J 11/14* (2006.01)

(52) U.S. Cl.
CPC ............ *B41J 25/308* (2013.01); *B41J 11/14* (2013.01)

(58) Field of Classification Search
CPC . B41J 25/308; B41J 11/14; B41J 11/20; B41J 13/0063
See application file for complete search history.

(56) References Cited

U.S. PATENT DOCUMENTS

| | | | |
|---|---|---|---|
| 7,290,949 B1 | 11/2007 | Phillips et al. | |
| 8,967,796 B2 | 3/2015 | Ito et al. | |
| 9,586,776 B2 | 3/2017 | Uchino et al. | |
| 2005/0232679 A1 | 10/2005 | Na et al. | |
| 2007/0048057 A1* | 3/2007 | Youn | B41J 25/308 400/58 |
| 2008/0049092 A1 | 2/2008 | Hirai | |
| 2013/0106950 A1 | 5/2013 | Karppinen et al. | |
| 2017/0259571 A1 | 9/2017 | Miyakoshi et al. | |
| 2018/0281464 A1 | 10/2018 | Bradway et al. | |
| 2020/0130384 A1* | 4/2020 | Tok | B41J 11/06 |

FOREIGN PATENT DOCUMENTS

| | | |
|---|---|---|
| JP | 1191194 A | 4/1999 |
| JP | 2013039722 A | 2/2013 |
| JP | 6409447 B2 | 10/2018 |
| WO | WO-WO2016164012 A1 | 10/2016 |

* cited by examiner

*Primary Examiner* — Scott A Richmond

(57) ABSTRACT

Example implementations relate to a printer comprising at least one printhead, carried by a carriage, to print onto a substrate, a surface to support the substrate; the surface comprising a plurality of platens associated with an elongate member; each platen having an upper planar surface forming part of the surface for supporting the medium and being adjustable to vary a characteristic of the upper planar surface to influence a distance between the upper planar surface and the at least one printhead.

15 Claims, 5 Drawing Sheets

200

100

200

300

400

500

PRINTERS

Printers such as, for example, large, medium and small format printers are configured to provide a desirable or acceptable image quality (IQ). The IQ can be affected or otherwise influenced by the distance between a pen that fires drops of print liquid such as, for example, an ink, and a substrate carried by a platen. The distance between the platen and the pen influences the print quality and is adjusted and set on a printer by printer basis. A scan axis beam is used to carry a carriage bearing the pen, as part of a printhead. The distance between the pen and the platen is controlled by adjusting the scan axis beam. However, IQ issues can still arise due to issue with the distance between the pen and the substrate.

BRIEF INTRODUCTION OF THE DRAWINGS

Example implementations are described below with reference to the accompanying drawings, in which.

DETAILED DESCRIPTION

Figure 1:
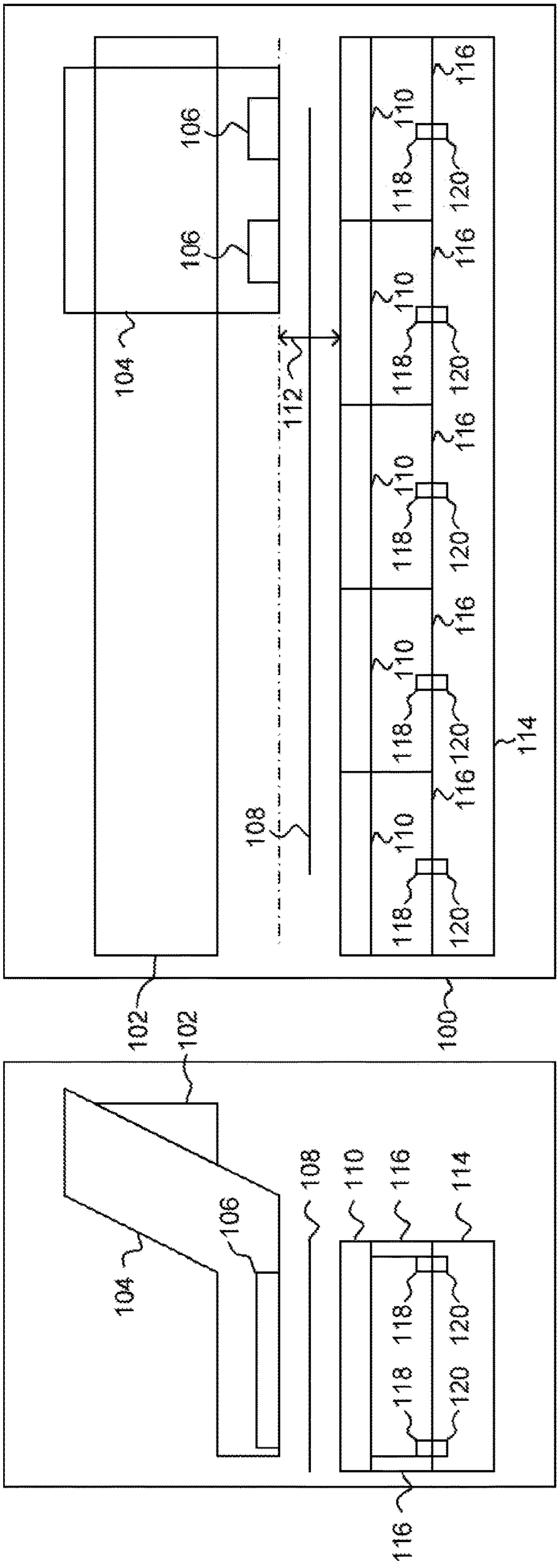
FIG. 1 shows a schematic view of a printer according to some examples.

FIG. 1 illustrates front and end schematic views of a printer 100. The printer 100 comprises a beam 102, known as a scan beam, that supports a printhead carriage 104. The printhead carriage 104 carries one or more than one printhead 106. In the example implementation depicted, the printhead carriage 104 has two printheads 106. The one or more than one printhead 106 is arranged to print one or more than one drop of a printing liquid. A printhead 106 can comprise one or more than one channel (not shown) for receiving and ejecting printing liquid. One or more than one printhead 106 can fire, that is, expel or eject, one or more than one printing liquid during a print traversal. The one or more than one printhead 106 is arranged to deposit respective drops of printing liquids onto a substrate 108. The one or more than one printing liquids can comprise one or more printing liquids associated with a respective colour process. Such a colour process can comprise a single tone or multiple tones. For example, a six-colour process, involving magenta, yellow, cyan, red and two blacks, can be used. Similarly, a nine-colour process could be used.

The printhead carriage 104, in this example, is arranged to move, in a reciprocating manner, while printing print liquids onto the substrate 108. The printheads 106 can use an array of nozzles (not shown) to deposit the printing liquids. Depositing the printing liquids can use a thermal technique, in which a transducer such as, for example, a heating element, is arranged to heat the printing liquid rapidly so that printing liquid is ejected from a nozzle associated with the heating element.

Although the example implementations described herein use a moveable printhead carriage 104, examples are not limited to such an arrangement. Example implementations can be realised that are page-wide printers that do not use a moveable carriage due to the printheads spanning the full width of the substrate 108 or working area. It will be appreciated that page-wide printers can comprises one or more than one printhead 106, that is, an array of printheads 106, whereas other page-wide printers can use a single printhead 106 with a page-wide array of nozzles.

The printer 100 also comprises one or more than one platen 110 for supporting the substrate 108. In the example implementation shown, a plurality of platens 110 are provided. A platen or each platen 110 bears an upper planar surface forming part of an overall surface for supporting the substrate 108.

The one or more than one printhead 106 is separated from the one or more than one platen 110 by a predetermined distance 112. The predetermined distance 112 can influence image quality. Suitably, the predetermined distance 112 should be controllable.

The one or more than one platen 110 is supported by a vacuum beam 114 via the intermediary of one or more than one respective support 116. The one or more than one respective support 116 is an example of a platen support. The vacuum beam 114 is an example of an elongate member. The vacuum beam 114 and the one or more than one respective support 116 comprise cooperating features 118 and 120. The cooperating features 118 and 120 are arranged to alter the relative positions of the vacuum beam 114 and the one or more than one respective support 116.

Although the example implementation depicted in FIG. 1 shows the vacuum beam 114 and the one or more than one respective support 116 as comprising cooperating features 118 and 120, example implementations are not limited to such an arrangement. Example implementations can be realised in which the cooperating features 118 and 120 are, additionally or alternatively, provided on the one or more than one platen 110 and the one or more than one respective support 116 to adjust the relative positions of the one or more than one platen 110 and the one or more than one respective support 116.

Altering the relative position of the vacuum beam 114 and at least one support 116 or the one or more than one respective support 116 allows the predetermined distance between a respective platen 110 and the one or more than one printhead 106 to be controlled. It will, therefore, be appreciated that the predetermined distances 112 can be set for each platen 110 of the one or more than one platen 110 by adjusting the relative positions between a respective support 116 and the vacuum beam 114.

Example implementations comprises such supports 116 having a plurality of such cooperating features 118 and 120, as will be described later with reference to FIGS. 3 to 5.

The cooperating features 118 and 120 are arranged to cooperate, in response to actuation using an adjustment tool (not shown, but described with reference to, and depicted in, FIG. 5). The adjustment tool is used to set or otherwise establish the relative position of the one or more than one respective support 116 and the vacuum beam 114.

The relative positions of the vacuum beam 114 and one or more than one respective support 116 can be fixed using further cooperating features of the vacuum beam 114 and the one or more than one support 116. The relative positions of the vacuum beam 114 and the one or more than one respective support 116 can be fixed using a fastener such as, for example, a nut and bolt or other fastener engaging complementary formations of the vacuum beam 114 and the one or more than one support 116. The complementary formations can comprise at least one or more of slots, holes or other apertures for accommodating one or more than one respective fastener, which are depicted in, and described with reference to, FIG. 3.

Referring to the end view, it can be appreciated that the one or more than one respective support 116 comprises anterior and posterior supports 116; each having the features described herein. At least one, or both, of the anterior and posterior supports 116 can be used to adjust the relative positions of the vacuum beam 114 and the supports 116 thereby influencing the printhead to platen predetermined distance 112. Example implementations can be provided in which each of the anterior and posterior supports 116 comprise a plurality of sets of cooperating formations 118 and 120. The cooperating formations such as the plurality of sets of cooperating formations 118 and 120 can be used to set or adjust at least one or more than one of the height or orientation of a respective platen 110 relative to a datum. The datum can be the printheads 106 or some other reference point.

Figure 2:
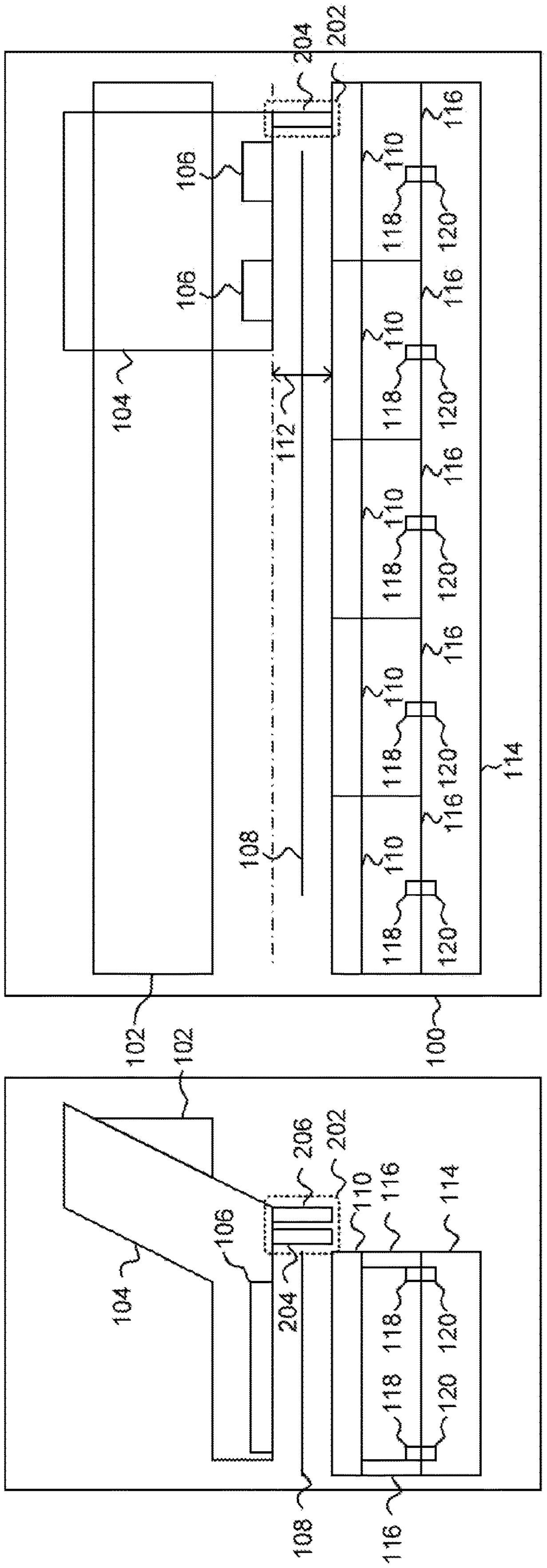
FIG. 2 illustrates schematically a view of a further printer according to example implementations.

Referring to FIG. 2, there is shown front and end views of a further printer 200 according to example implementations. Reference numerals common to FIGS. 1 and 2 refer to the same features. It can be appreciated that the example implementation of the printer 200 depicted in FIG. 2 comprises an adjustment mechanism 202 for controlling or influencing at least one, or both, of the predetermined distance 112 or the orientation of the one or more than one printhead 106 relative to the one or more than one platen 110. Examples can be realised in which the adjustment mechanism 202 comprises a pair of features 204 and 206 that allow at least one, or both, of the predetermined distance 112 or the orientation of the one or more than one printhead 106 relative to the one or more than one platen 110 to be adjusted. It will be appreciated that adjusting both features 204 and 206 by the same amount will increase or decrease the predetermined distance 112. Changing a single one of the features 204 and 206, or adjusting both of the features 204 and 206 by different amounts, will alter the orientation of the one or more than one printhead 106 relative to the one or more than one platen 110.

Figure 3:
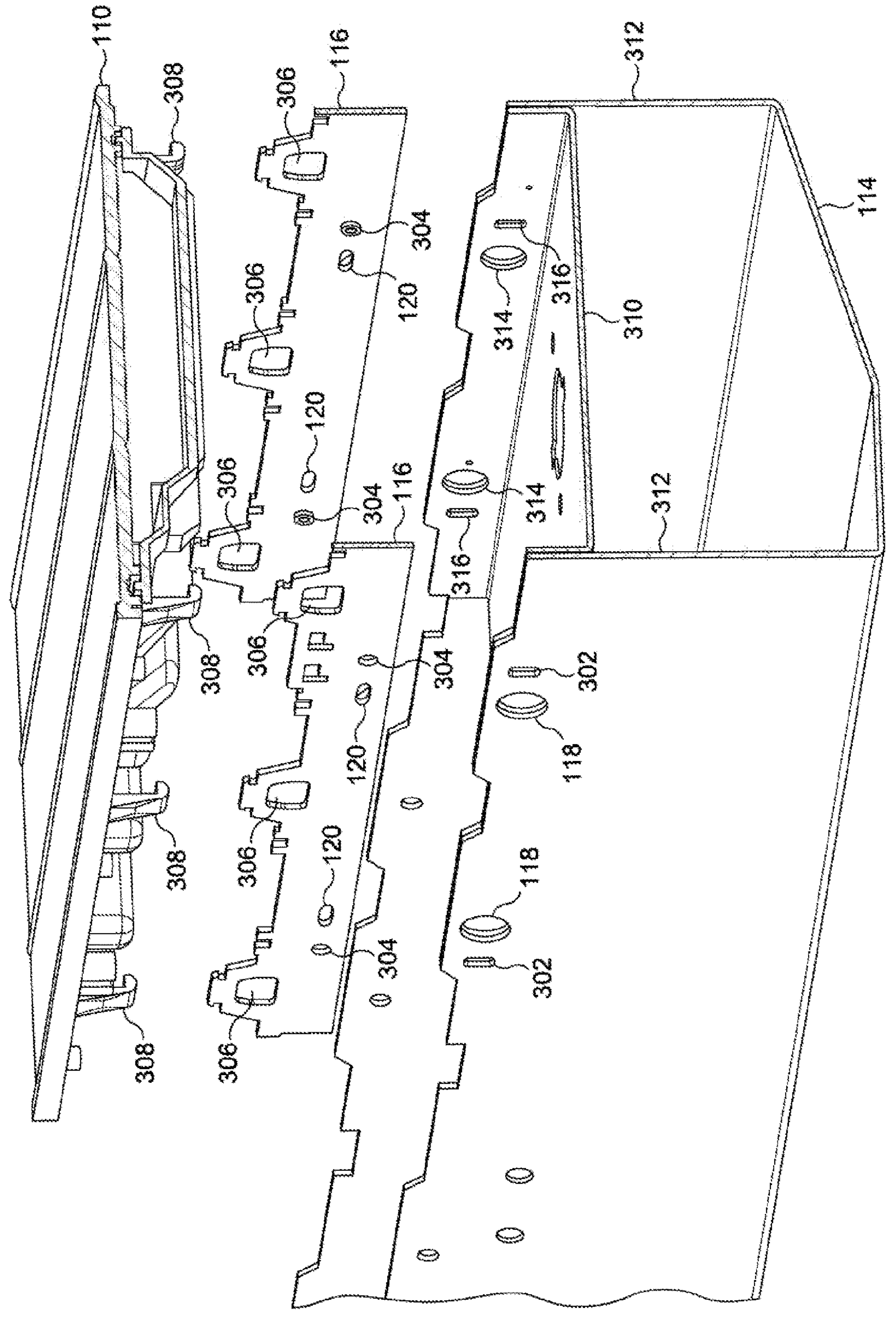
FIG. 3 depicts a vacuum beam, support and platen according to example implementations.

Referring to FIG. 3, there is shown a 3D view 300 of a platen 110, a support 116 and the vacuum beam 114. The vacuum beam 114 comprises one or more than one of the above cooperating formations 118 that are positioned to cooperate with corresponding formations 120 on the support 116. In the example depicted, the vacuum beam comprises a predetermined number of such formations 118 per platen 110 or per support 116. The vacuum beam 114, in the particular example shown in FIG. 3, has four cooperating formations 118. The anterior and posterior supports 116 each have a corresponding number of cooperating formations 120. The corresponding number of cooperating formations comprises one or more than one aperture. Example implementations can be realised in which the one or more than one aperture comprises a slot for engaging a spigot or other protrusion of the adjustment tool. The spigot or other protrusion is an example of a cam. The one or more than one aperture for receiving the spigot or other protrusion is an example of a cam follower. The aperture or slot is elongate and orientated so that actuation using the adjustment tool varies the relative position of the vacuum beam 114 and the support 116. As described below, the spigot or other protrusion and the adjustment tool have off-set, that is, non-colinear, axes. Inserting the adjustment tool into a formation 118 of the vacuum beam 114 whilst engaging the spigot or other protrusion into the formation 120 of the support 116, and rotating the adjustment tool causes the relative position of the vacuum beam 114 and support 116 to change. In the example shown, the aperture or slot is orientated parallel to a longitudinal axis of the vacuum beam 114.

The relative position of the vacuum beam 114 and a support 116 can be fixed or set using the above mentioned fasteners that engage with the complementary formations mentioned above. In the example shown, the complementary formations comprises at least one aperture 302 of the vacuum beam 114. The example depicted in FIG. 3 comprises a set of apertures 302 such as, for example, four apertures. The apertures 302 of the vacuum beam 114 can comprises one or more than one slot. The one or more than one slot can have a predetermined orientation. In the example shown, the apertures 120 and 302 are mutually perpendicular to one another. A corresponding complementary formation 304 is provided on the support 116 for each complementary formation 302 of the vacuum beam 114. The complementary formations 302 and 304 are arranged to accommodate respective fasteners to fix the relative positions of the vacuum beam 114 and the support 116, which, in turn, fixes or sets at least one of the predetermined distance 112 or orientation of a respective platen 110.

Still referring to FIG. 3, it can be seen that a support 116 comprises a set of platen engagement features 306. A set of platen engagement features 306 can comprise one or more than one platen engagement feature. In the example depicted in FIG. 3, a set of platen engagement features comprises a predetermined number of platen engagement features per support such as, for example, the three platen engagement features 306 shown. Accordingly, the platen 110 comprises a respective or corresponding set of support engagement features 308. A set of support engagement features 308 can comprise one or more than one support engagement feature. In the example depicted in FIG. 3, a set of support engagement features comprises a predetermined number of support engagement features per support such as, for example, the support platen engagement features 308 shown. In the example shown in FIG. 3, a platen engagement feature 306 comprises a respective aperture and a support engagement feature 308 comprise a leg bearing a hook to engage the platen engagement aperture. A resiliently deformable biasing member (not shown) such as, for example, a spring, can be provided on one or more than one support engagement feature to urge the platen 110 away from the support 116.

Example implementations can also be realised in which the vacuum beam 114 cooperates with a vacuum beam brace 310. The vacuum beam brace 310 is arranged to brace, that is, provide rigidity to, the upwardly orientated legs 312 of the vacuum beam 114. The brace 310 comprise formations corresponding to those described above with reference to the vacuum beam 114 and the support 116, which will be described with reference to FIG. 4. For example, the brace 310 comprises cooperating formations 314 corresponding to the cooperating formations 118 of the vacuum beam 114, as well as apertures 316 corresponding to apertures 302 of the vacuum beam 114 to allow movement and positioning of the support 116.

Figure 4:
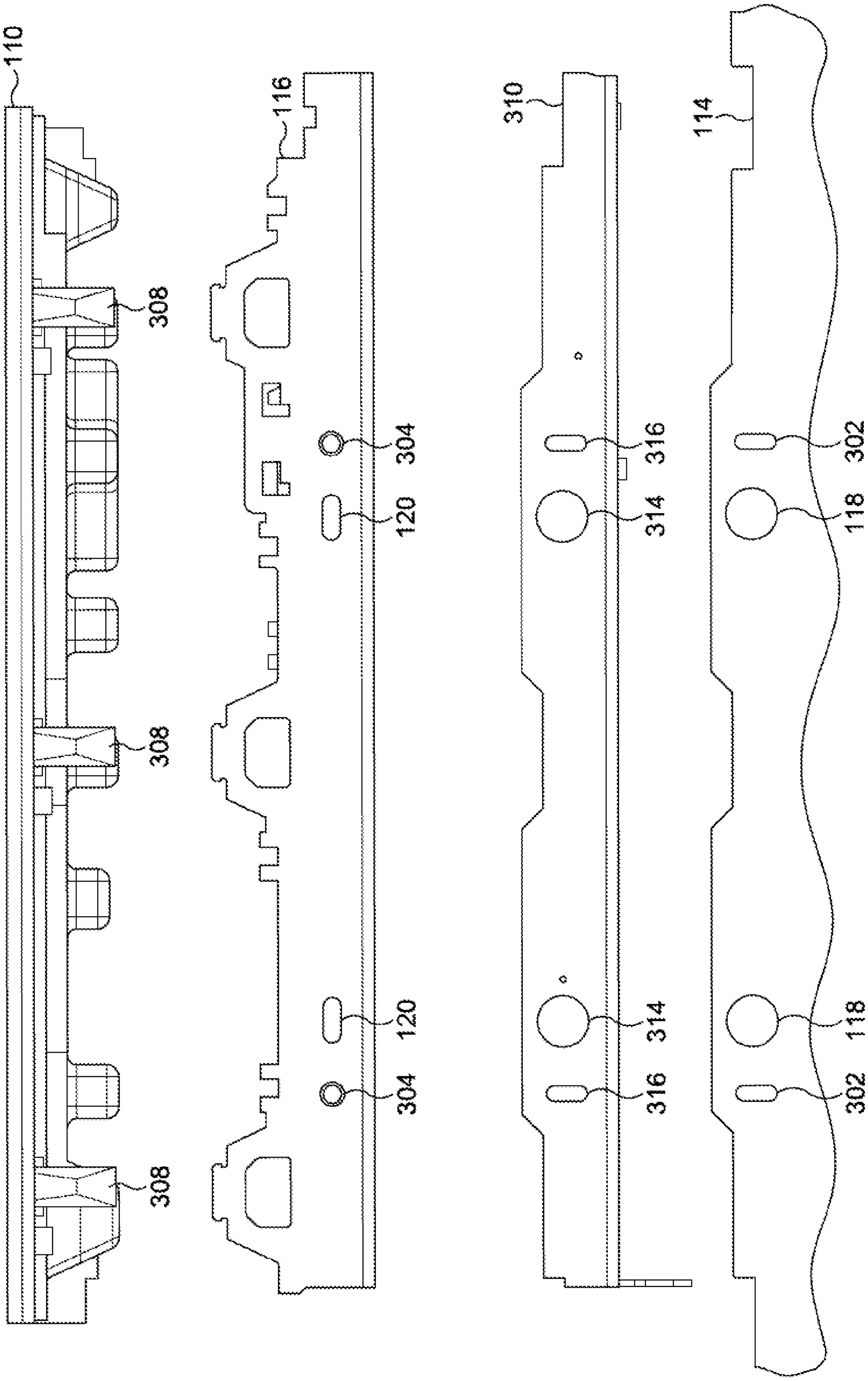
FIG. 4 shows a front view of the vacuum beam, support and platen according to example implementations.

Referring to FIG. 4, there is shown a front view 400 of a platen 110, a vacuum beam 114, a support 116 and a brace 310. Reference numerals common to FIGS. 3 and 4 refer to the same entities. FIG. 4 more clearly illustrates the alignment or registration of the cooperating features 118 and 120, and, optionally, features 314, as well as the alignment or registration of complementary features 302 and 304, and, optionally, features 316.

Figure 5:
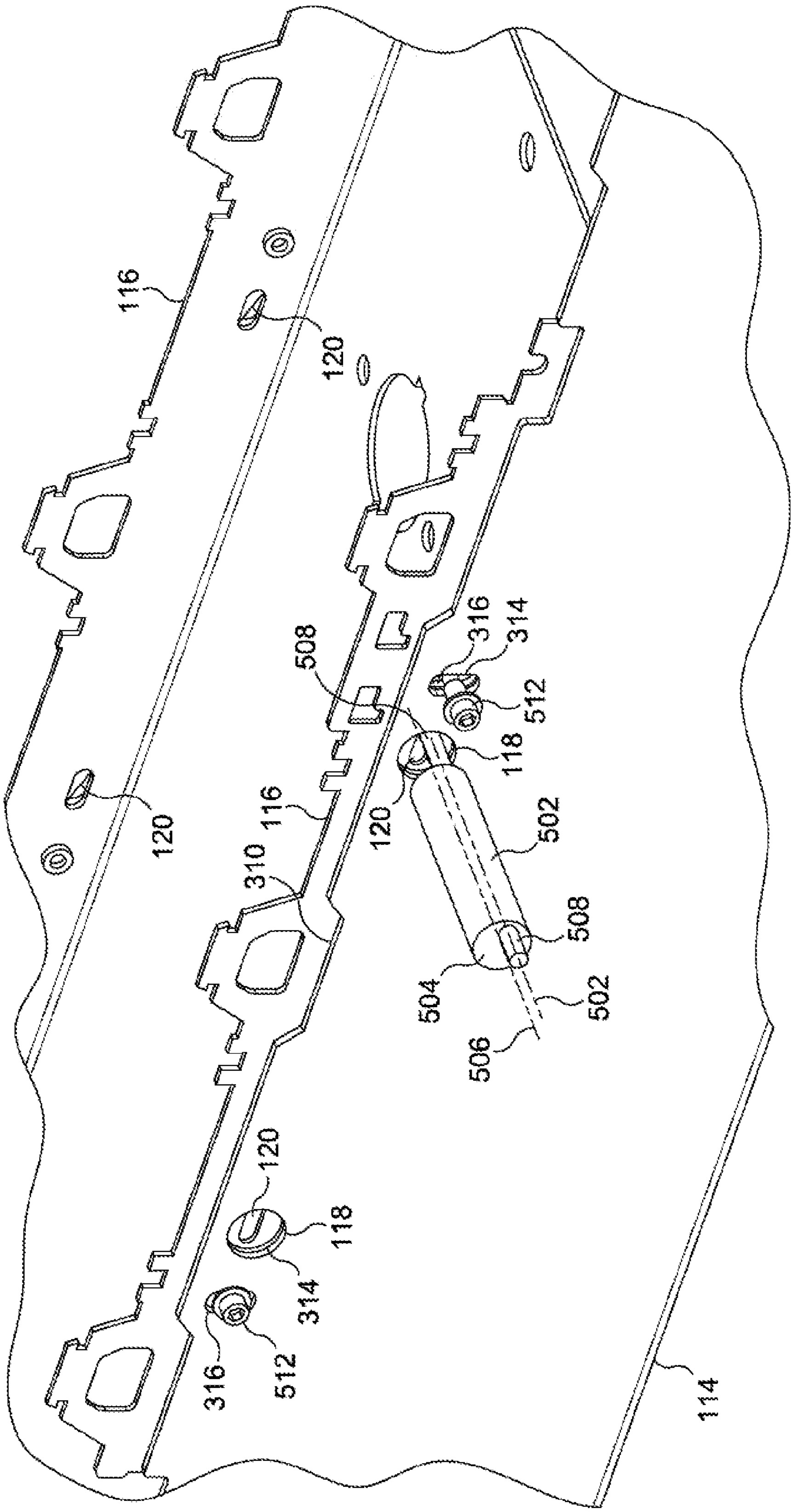
FIG. 5 illustrates using an adjustment tool according to example implementations.

Referring to FIG. 5, there is shown a view 500 demonstrating using an adjustment tool 502 to adjust or otherwise set or vary the relative position of the vacuum beam 114 and the support 116. The adjustment tool 502 comprises a body 504 having a rotational axis 506. At least one end, or both ends, of the body 504 bears a spigot or other protrusion 508. The spigot or other protrusion 508 has a respective axis 510. It can be seen that the axes 506 and 510 are off-set such that the spigot axis 510 rotates around the body axis 506 when the body 504 is rotated. The spigot or protrusion 508 is arranged to engage with formation 120 to form a cam and cam follower respectively. The body 504 is arranged to engage with at least one, or both, of the formation 118 or the formation 314 to secure the position of the adjustment too relative to the vacuum beam 114 such that rotating the adjustment tool varies the relative position of the support 116 relative to the vacuum beam 114. By varying the position of the support 116 relative to the vacuum beam 114 the position of a platen 110 associated with the support 116 can be varied and fixed using a fastener 512. The process of engaging the spigot or other protrusion 508 into the cooperating formation 120, and arranging for the body 504 to engage with at least one, or both, of cooperating formations 118 or 314, can be repeated in respect of all sets of formations 118, 120, and/or 314 to set at least one, or both, of the position or orientation of the support 116 relative to the vacuum beam 114, which, in turn, when the platen 110 is mounted to the support 116, sets at least one, or both, of the predetermined distance 112 or relative orientation between the platen 110 and the printheads 106.

The process of adjusting and setting at least one, or both, of the predetermined distance 112 or relative orientation between the platen 110 and the printheads 106 can be repeated for each platen 110 of the printer 100 or for a subset of the platens of the printer 100.

Although the above implementations have been described within a thermal inkjet (TIJ) printing context, example implementations are not limited to such a technology. Any and all example implementations can be used technology other than TIJ technology such as, for example, piezoelectric print heads.

It will be appreciated the example implementations can be realised using page-wide printheads. Some printers have one or more than one printhead that spans the substrate to be printed. Such printers are known as page-wide arrays. Page-wide array printers can have static printheads, that is, the carriage bearing the printheads does not traverse the medium rather the medium moves relative to the one or more than one printhead.

Example implementations can be realised according to the following clauses:

Clause 1: A printer comprising at least one printhead, carried by a carriage, to print onto a substrate, a surface to support the substrate; the surface comprising a plurality of platens associated with an elongate member; each platen having an upper planar surface forming part of the surface for supporting the substrate and being adjustable to vary a characteristic of the upper planar surface to influence a distance between the upper planar surface and the at least one printhead.

Clause 2: The printer of clause 1, in which each platen is mounted on at least one support disposed between the elongate member and the platen; the at least one support bearing a plurality of features to vary the characteristic of the upper planar surface to influence the distance between or relative orientation of the upper planar surface and the at least one printhead.

Clause 3: The printer of clause 2, in which the at least one support and elongate member comprise complementary features used to vary or set the characteristic of the upper planar surface.

Clause 4: The printer of clause 3, in which the complementary features comprise respective adjustment tool engagement features of the at least one support and the elongate member.

Clause 5: The printer of clause 4, in which the respective adjustment tool engagement features comprise an adjustment tool receiving aperture in the elongate member and a cam follower of the at least one support to receive a cam of the adjustment tool.

Clause 6: The printer of either of clauses 4 and 5, in which the complementary features comprise respective aligned apertures to receive fasteners to secure the position of the at least one support relative to the elongate member to vary or set the characteristics of the upper planar surface.

Clause 7: The printer of any of clauses 4 to 6, in which the complementary feature of the elongate axial member comprises an adjustment tool receiving portion arranged to maintain a relative position of a body, having an axis of rotation, of the adjustment tool, and in which the complementary feature of the at least one support receives an off axis feature to adjust the relative position of the elongate member and the at least one support on rotating the body.

Clause 8: The printer of any preceding clause, in which the complementary feature of the elongate member comprises an adjustment tool receiving aperture and the complementary feature of the at least one support comprises an elongate slot.

Clause 9: A method of adjusting an orientation of a platen of a printer, the printer comprising an elongate member bearing a platen support on which the platen is mounted; the method comprising setting the relative position of the platen and the elongate member using the platen support cooperating with both the platen and the elongate member.

Clause 10: The method of clause 9 in which said setting comprises actuating corresponding formations of both the platen support and at least one of the platen and the elongate member to influence the relative position of the platen and the elongate member Clause 11: The method of clause 10, in which said actuating comprises engaging cooperating formations of an adjustment member and at least the platen support, and actuating the adjustment member to influence the relative position of the platen and the elongate member using the platen support.

Clause 12: The method of clause 11, in which said engaging cooperating formations of the adjustment member and at least the platen support comprises engaging cooperating formations of the adjustment member and both the platen support and at least one of the platen and the elongate member.

Clause 13: The method of clause 12, in which said engaging cooperating formations of the adjustment member and both the platen support and at least one of the platen and the elongate member comprises engaging cooperating formations the adjustment member, the platen support and platen.

Clause 14: The method of clause 12, in which said engaging cooperating formations of the adjustment member and both the platen support and at least one of the platen and the elongate member comprises engaging cooperating formations the adjustment member, the platen support and the elongate member.

Clause 15: The method of clause 14, in which said engaging cooperating formations of the adjustment member and both the platen support and at least one of the platen and the elongate member comprises engaging cooperating formations of the adjustment member, the platen support, the platen and the elongate member.

Clause 16: The method of any of clauses 9 to 15, comprising fixing the relative position of the platen and the elongate member by fixing the relative positions of the platen, the platen support and the elongate member.

Clause 17: The method of clause 16, in which said fixing the relative position of the platen and the elongate member by fixing the relative positions of the platen, the platen support and the elongate member comprises using a fastener to fix the relative position of the platen and the elongate member by fixing the relative positions of the platen, the platen support and the elongate member.

Clause 19: An adjustment tool having a body with an axis of rotation; the body bearing a cam to be inserted into a cam follower; the cam being disposed off-axis relative to the axis of rotation to rotate about the axis of rotation; the body bearing means to receive torque to rotate the cam about the axis of rotation.

The invention claimed is:

1. A printer comprising a. at least one printhead, carried by a carriage, to print onto a substrate, b. a surface configured to support the substrate; the surface comprising a plurality of platens associated with an elongate member; the elongate member comprising an adjustment tool receiving apertures, wherein the adjustment tool receiving apertures are oriented along a longitudinal axis of the elongate member; each platen:

i. having an upper planar surface forming part of the surface for supporting the substrate and ii. being adjustable to vary a characteristic of the upper planar surface to influence a distance between the upper planar surface and the at least one printhead.

2. The printer of claim 1, in which each platen is mounted on at least one support disposed between the elongate member and the platen; the at least one support bearing a plurality of features to vary the characteristic of the upper planar surface to influence the distance between or relative orientation of the upper planar surface and the at least one printhead.

3. The printer of claim 2, in which the at least one support and elongate member comprise complementary features used to vary or set the characteristic of the upper planar surface.

4. The printer of claim 3, in which the at least one support comprises an elongate slot.

5. The printer of claim 3, in which the complementary features comprise respective adjustment tool engagement features of the at least one support and the elongate member.

6. The printer of claim 5, in which the complementary features comprise respective aligned apertures to receive fasteners to secure the position of the at least one support relative to the elongate member to vary or set the characteristic of the upper planar surface.

7. The printer of claim 5, in which the complementary feature of the elongate member comprises an adjustment tool receiving portion arranged to maintain a relative position of a body, having an axis of rotation, of the adjustment tool, and in which the complementary feature of the at least one support receives an off axis feature to adjust the relative position of the elongate member and the at least one support on rotating the body.

8. A printer comprising a. at least one printhead, carried by a carriage, to print onto a substrate, b. a surface configured to support the substrate; the surface comprising a plurality of platens associated with an elongate member; the elongate member comprising an adjustment tool receiving aperture; each platen:

i. having an upper planar surface forming part of the surface for connecting the substrate and ii. being adjustable to vary a characteristic of the upper planar surface to influence a distance between the upper planar surface and the at least one printhead, wherein each platen is mounted on at least one support disposed between the elongate member and the platen, wherein the at least one support bears a plurality of features to vary the characteristic of the upper planar surface to influence the distance between or relative orientation of the upper planar surface and the at least one printhead, wherein the at least one support and elongate member comprise complementary features used to vary or set the characteristic of the upper planar surface, wherein the complementary features comprise respective adjustment tool engagement features of the at least one support and the elongate member; and wherein the respective adjustment tool engagement features comprise a cam follower of the at least one support to receive a cam of the adjustment tool.

9. A method of adjusting an orientation of a platen of a printer, the printer comprising an elongate member bearing a platen support on which the platen is mounted, the elongate member comprising an adjustment tool receiving apertures, wherein the adjustment tool receiving apertures are oriented along a longitudinal axis of the elongate member; the method comprising:

a. setting the relative position of the platen and the elongate member using the platen support cooperating with both the platen and the elongate member.

10. The method of claim 9 in which said setting comprises actuating corresponding formations of both the platen support and at least one of the platen and the elongate member to influence the relative position of the platen and the elongate member.

11. The method of claim 10, in which said actuating comprises engaging cooperating formations of an adjustment member and at least the platen support, and actuating the adjustment member to influence the relative position of the platen and the elongate member using the platen support.

12. The method of claim 11, in which said engaging cooperating formations of the adjustment member and at least the platen support comprises engaging cooperating formations of the adjustment member and both the platen support and at least one of the platen and the elongate member.

13. The method of claim 12, in which said engaging cooperating formations of the adjustment member and both the platen support and at least one of the platen and the elongate member comprises engaging cooperating formations the adjustment member, the platen support and platen.

14. The method of claim 12, in which said engaging cooperating formations of the adjustment member and both the platen support and at least one of the platen and the elongate member comprises engaging cooperating formations the adjustment member, the platen support and the elongate member.

15. The method of claim 14, in which said engaging cooperating formations of the adjustment member and both the platen support and at least one of the platen and the elongate member comprises engaging cooperating formations of the adjustment member, the platen support, the platen and the elongate member.

* * * * *